United States Patent [19]
Katoh et al.

[11] Patent Number: 6,124,052
[45] Date of Patent: Sep. 26, 2000

[54] SOLID POLYMER ELECTROLYTE FUEL CELL SYSTEM

[75] Inventors: Hirohisa Katoh; Hidehito Kubo; Toshiro Fujii, all of Kariya, Japan

[73] Assignee: Kabushiki Kaisha Toyoda Jidoshokki Seisakusho, Kariya, Japan

[21] Appl. No.: 09/112,090

[22] Filed: Jul. 9, 1998

[30] Foreign Application Priority Data

Jul. 11, 1997 [JP] Japan .................................. 9-186908

[51] Int. Cl.[7] .............................. H01M 8/04; H01M 8/10
[52] U.S. Cl. .................................. 429/33; 429/34
[58] Field of Search ................. 429/25, 33, 34; 417/228

[56] References Cited

U.S. PATENT DOCUMENTS

| | | | |
|---|---|---|---|
| 4,769,297 | 9/1988 | Reiser et al. | 429/34 X |
| 4,973,530 | 11/1990 | Vanderborgh et al. | 429/34 X |
| 5,503,944 | 4/1996 | Meyer et al. | 429/25 X |
| 5,605,770 | 2/1997 | Andreoli et al. | 429/25 X |
| 5,626,470 | 5/1997 | Gerhard | 418/84 |
| 5,639,165 | 6/1997 | Aizawa et al. | 384/315 |

FOREIGN PATENT DOCUMENTS 5-94832 4/1993 Japan .

*Primary Examiner*—Stephen Kalafut
*Attorney, Agent, or Firm*—Morgan & Finnegan, L.L.P.

[57] ABSTRACT

A solid polymer electrolyte type fuel cell system having a reduced size and weight, which exhibits an improved efficiency. To supply reaction gas to an anode or a cathode, a water lubricated type compressor is employed with the following operational advantages. The face pressure of sliding faces of the water lubricated type compressor, that is the compression ratio and number of revolutions thereof, can be greatly improved, as compared to the conventional oil free type compressor. The compression efficiency is improved by reducing of leakage of reaction gas between the sliding faces. No oil film is formed so as not to deteriorate the battery performance. The size of the water lubricated type compressors can be greatly reduced to about one-third to a half of the conventional oil free type compressor. In addition, the improvement of the compression efficiency and reduction of the friction loss result in a great reduction of driving power. Hence, the fuel cell system with the present arrangement is practical particularly when used as a power supply for driving a vehicle, which is severely required to have a reduced size and weight and to be economical.

2 Claims, 1 Drawing Sheet

SOLID POLYMER ELECTROLYTE FUEL CELL SYSTEM

BACKGROUND OF THE INVENTION

1. Field of the Invention

The present invention relates to a solid polymer electrolyte type fuel cell system.

2. Description of Related Art

Conventionally, when it is required to increase the supplying pressure of reaction gas to be supplied to a solid polymer electrolyte type fuel cell, reaction gas supplied to one or both of an anode and a cathode, which face each other through a solid polymer electrolyte film, has been pressurized by using an oil free type compressor.

The solid polymer electrolyte film is generally composed of an ion-exchange film containing proton (hydrogen ion)-exchange groups, and acts as a proton conductive electrolyte in a water-containing state. So, by humidifying reaction gas to be supplied to the anode and the cathode, drying of the solid polymer electrolyte film has been prevented, whereby a high specific conductance of the solid polymer electrolyte film has been maintained, and the battery performance has been enhanced.

The well known lubrication methods for lubricating the sliding faces of the compressor (in particular, the displacement type compressor) include an oil free or solid lubrication method using a solid lubricant such as graphite or molybdenum disulfide, or a solid lubrication film (PTFE film), each having a low coefficient of friction, an oil lubrication method using oil or grease, and a water lubrication method using a water film.

In the above-described solid polymer electrolyte type fuel cell, due to the adhesion of an oil film to surfaces of the electrolyte, and to the anode and cathode thereof, the fuel cell reaction activity drops considerably. So, to pressurize reaction gas to be supplied to the cell, it has been necessary to use an oil free type compressor.

The oil free type compressor which lubricates the sliding faces of a cylinder bore or the like with solid lubricant or PTFE film, however, has the following problems. During operation, gas leakage may occur between the sliding faces, and the coefficient of friction thereof is great, so that it is difficult to increase the surface pressure (compression ratio) of the sliding faces. In addition, in order to restrain wear of the sliding members, the sliding speed, that is the number of revolutions, must be reduced. Consequently, to ensure a necessary supplying volume of reaction gas for the fuel cell, the size of the compressor must be made remarkably large, as compared to the normal oil lubricated type compressor, which results in a great increase in the power needed to drive the compressor, as compared to the normal oil lubricated type compressor.

SUMMARY OF THE INVENTION

It is an object of the present invention to provide a solid polymer electrolyte type fuel cell system having a reduced size and weight, which can exhibit an improved efficiency.

In a first aspect of the solid polymer electrolyte type fuel cell system in accordance with the present invention, a water lubricated type compressor is employed for supplying reaction gas to an anode or a cathode. With this arrangement, the following operational advantages can be achieved.

The surface pressure of sliding faces, that is the compression ratio and number of revolutions, can be greatly improved, as compared to the conventional oil free type compressor having the solid lubricant or the PTFE film, and the compression efficiency is improved by reducing leakage of reaction gas between the sliding faces. Further, no oil film is formed in the cell so as not to deteriorate the battery performance. Furthermore, the size of the compressor can be reduced greatly to about one-third to a half of the conventional oil free type compressor. The improvement of the compression efficiency and reduction of the friction loss result in the necessary driving power being reduced greatly. Hence, the fuel cell system of the present invention is practical particularly when used as a power supply for driving a vehicle, which must have greatly reduced size and weight to be economical.

In accordance with the present invention, the means for humidifying reaction gas to be supplied to the fuel cell, such as a tank or pump, can serve as the means for supplying water to the water lubricated type compressor, too, which effects a simple arrangement of the system.

Water evaporated from the sliding faces of the water lubricated type compressor humidifies the reaction gas, too, which can simplify or omit a humidifying mechanism for humidifying the reaction gas prior to supplying it to the fuel cell, and consequently can reduce or eliminate the water consumption in the humidifying mechanism for the fuel cell.

A second aspect of the solid polymer electrolyte type fuel cell system in accordance with the present invention has an arrangement similar to that of the first aspect, and is further provided with the arrangement that water extracted from a gas discharge passage is recycled to the water lubricated type compressor.

Namely, gas discharged from the fuel cell contains vapor added for humidification, and a large volume of water results from the battery reaction. By separating water from gas, and returning it to the water lubricated type compressor, the water-supplying interval to the water lubricated compressor can be extended or the water supply thereto can be entirely omitted. In particular, the fuel cell system in accordance with the present invention can be effectively used as a fuel cell system to be mounted on a vehicle for supplying electricity to a vehicle-driving motor, which is incapable of being connected to a fixed water supply source, and in which it is difficult to hold a large volume of water for continuous use.

Other objects, features, and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
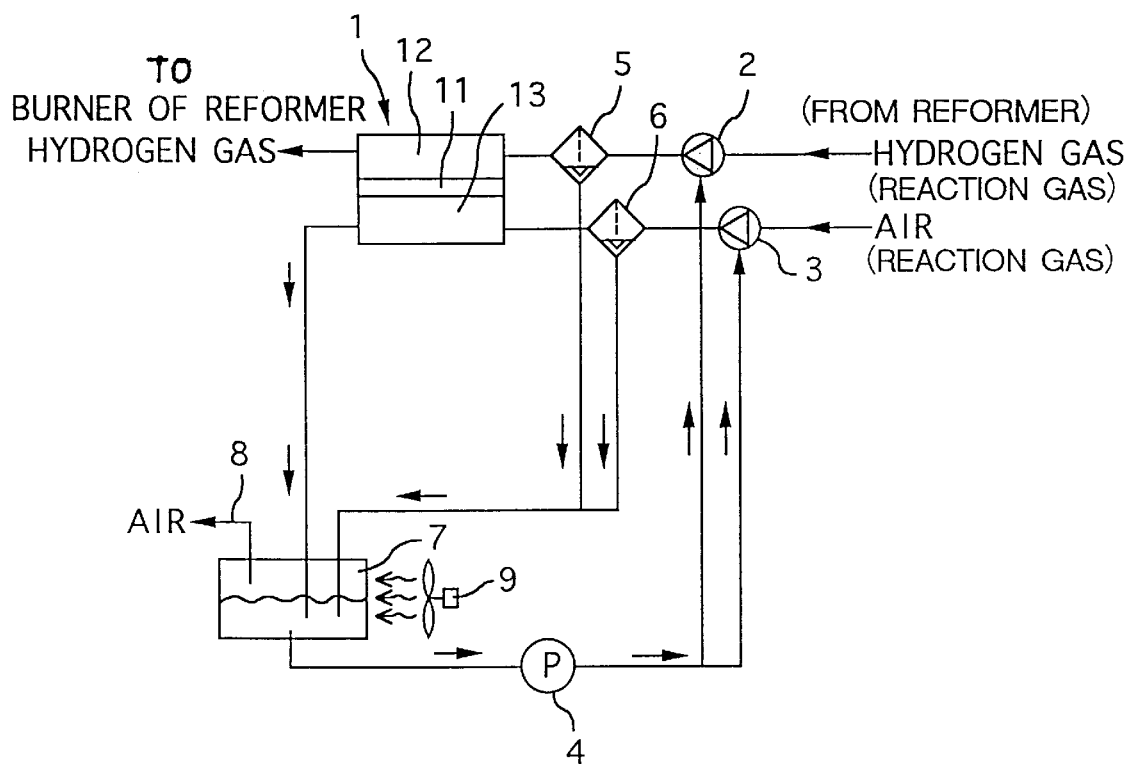
FIG. 1 is a diagram showing one embodiment of a solid polymer electrolyte type fuel cell system in accordance with the present invention.

Examples of the water lubricated compressor include various reciprocating displacement type compressors, of which cylinder bores are lubricated with water film, and displacement type compressors such as a scroll type compressor. Furthermore, blowers or the like are included therein. The water for lubrication can be supplied to bearings or the like, too.

A first embodiment of the solid polymer electrolyte type fuel cell system will be explained with reference to FIG. 1.

Reference numeral 1 designates a solid polymer electrolyte type fuel cell. In the fuel cell 1, an anode 12 and a cathode 13 are disposed with a solid polymer electrolyte film 11 interposed therebetween.

Reference numerals 2 and 3 each designate a water lubricated type compressor, respectively. The compressor 2 increases the pressure of reaction gas supplied from a reformer (not shown) up to the reaction pressure of the cell, and the compressor 3 increases the pressure of air (as reaction gas) which is introduced from the outside of the system by way of a filter (not shown) up to the reaction pressure of the cell. The above-described reformer produces a gas-mixture of hydrogen gas and carbonic acid gas, as reaction gas, from methanol and steam. The detailed explanation of the reformer will be omitted, because the reformer does not constitute a main component of the fuel cell system in accordance with the present invention.

Reference numeral 4 designates a pump which supplies the sliding faces of the water lubricated type compressors 2 and 3 with water for lubrication. Reference numerals 5 and 6 each designate a water separator, respectively. The water separators 5 and 6 separate water droplets from the reaction gas which has been pressurized by the water lubricated type compressors 2 and 3. Reaction gas emitted from the water separator 5 is supplied to the anode 12, while the air emitted from the water separator 6 is supplied to the cathode 13. In the cell 1, hydrogen gas reacts on oxygen gas to form water, and a potential difference is produced between the anode 12 and the cathode 13, thereby generating electric power.

Reaction gas emitted from the anode 12 in which the hydrogen gas concentration is decreased, is fed to the reformer, and then burned therein.

The air emitted from the cathode 13 in which the oxygen gas concentration is decreased, is fed to the water tank 7. The air emitted from the cathode 13 contains water, intermixed upon pressurizing using the water lubricated type compressor 3 and formed in the cell 1 as vapor or drops. The water contained in the air emitted from the cathode 13 is separated in the water tank 7 by gravity, and the remaining air is released outside of the water tank 7 from an upper part thereof by way of an air release pipe 8. Reference numeral 9 designates a blower for cooling the water tank 7 indirectly, thus promoting the condensation of the vapor.

The water separated by the water separators 5 and 6 is also fed to the water tank 7 by gravity, and collected therein. Then, the water within the water tank 7 is fed again to the water lubricated type compressors 2 and 3 by means of the pump 4. With the present embodiment, piston type compressors were used as the water lubricated type compressors 2 and 3. Alternatively, another type of compressor can be employed. In these water lubricated type compressors 2 and 3, in order to form the water film on the surface of a cylinder bore, the pump 4 sprays water on reaction gas prior to its supply to the cylinder bore, for example, thus intermixing water with reaction gas. Alternatively, water from the pump 4 can be supplied onto an inner peripheral surface (sliding face) of the cylinder bore using a method similar to the conventional oil supplying method.

The water separators 5 and 6 can be adapted to a well known arrangement in which a gas-passable screen is provided perpendicularly to the horizontal direction in which reaction gas flows, to separate water from reaction gas. Alternatively, the water separators 5 and 6 can be adapted to a well known centrifugal separation structure wherein a spinning stream is formed using the kinetic energy of reaction gas supplied from the water lubricated type compressors 2 and 3 to selectively blow the waterdroplets outwardly in a centrifugal direction, thus separating water from reaction gas.

By providing a nozzle in the air release pipe 8 to reduce the pressure therewithin, the pressure of the interior of the water tank 7 can be increased. With this arrangement, a sufficient volume of water can be supplied from the water tank 7 to the water lubricated type compressors 2 and 3 without using the pump 4.

With the solid polymer electrolyte type fuel cell system of the present embodiment, the above-described operational advantages of the present invention can be achieved.

The water separators 5 and 6 do not constitute essential components of the fuel cell system of the present invention. Where large-sized water drops can be prevented from flowing into the cell 1, the water separators 5 and 6 can be omitted.

A humidifier can be provided upstream or downstream of the water separator 5 or 6. This arrangement is effective when the volume of water supplied to the reaction gas from the water lubricated type compressors 2 and 3 is small. The humidifier can serve as the water separator 5 or 6, too. In this case, the water separator 5 or 6 can be replaced with the humidifier.

Furthermore, either of the water lubricated type compressors 2 and 3 can be replaced with an oil free type compressor.

Figure 2:
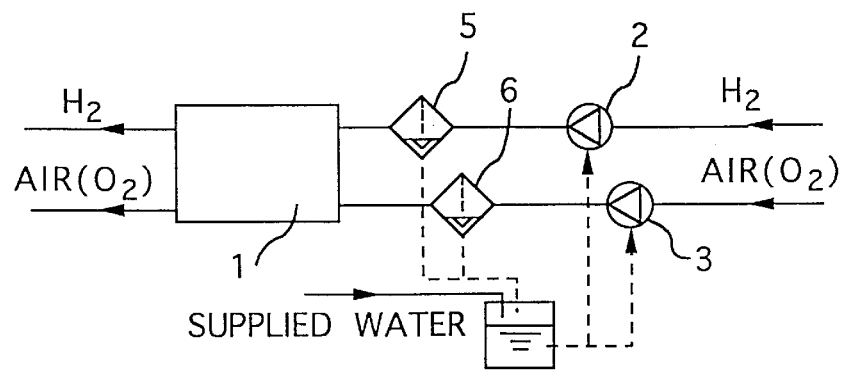
FIG. 2 is a diagram showing another embodiment of a solid polymer electrolyte type fuel cell system in accordance with the present invention.

A second embodiment of the present invention will be explained with reference to FIG. 2.

The system of the present embodiment has the arrangement that the pump 4 and blower 7 are omitted from the system of the first embodiment illustrated in FIG. 1, and water is supplied to the water tank 7 without collecting water from the air discharged from the fuel cell 1, thus effecting a simple arrangement. The present system is effective when water can be easily supplied from the outside of the system.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A solid polymer electrolyte fuel cell system comprising:

a cell having an anode and a cathode disposed with a solid polymer electrolyte film interposed therebetween;

a first reaction gas supply passage for supplying a first reaction gas to said anode;

a second reaction gas supply passage for supplying a second reaction gas to said cathode;

a gas discharge passage for discharging the second reaction gas from said cell;

pressurizing means provided in at least one of said first reaction gas supply passage and said second reaction gas supply passage for compressing reaction gas, said pressurizing means being a water lubricated compressor; and humidification means for humidifying at least one of said first reaction gas and said second reaction gas to be supplied to the cell, said humidification means being the water lubricated compressor.

2. A solid polymer electrolyte fuel cell system as claimed in claim 1, further comprising a recycling means for returning water extracted from said gas discharge passage to said water lubricated compressor.

* * * * *